UNITED STATES PATENT OFFICE 2,517,893

STABILIZED CHLOROHYDROCARBON CLEANING COMPOSITION

Arthur W. Larchar, Mendenhall, Pa., assignor to E. I. du Pont de Nemours & Company, Wilmington, Del., a corporation of Delaware No Drawing. Application May 13, 1946, Serial No. 669,458

12 Claims. (Cl. 252—171)

This invention relates to the stabilization of chlorinated hydrocarbons against decomposition and their use as cleaning compositions, such as in the degreasing of metals. More particularly this invention relates to a method for preventing or retarding the decomposition of volatile chlorohydrocarbon solvents and to compositions containing volatile chlorohydrocarbon solvents stabilized against decomposition, such as is encountered in the degreasing of metals.

Although volatile chlorinated hydrocarbons are excellent cleaning and degreasing agents, they possess certain disadvantages. Volatile chlorinated hydrocarbons, such as trichloroethylene, tend to decompose upon exposure to air, light and heat to give acidic products. Furthermore, the use of chlorinated hydrocarbons for degreasing metals or in metallic apparatus has the disadvantage that metals, such as aluminum or iron, tend to induce and catalyze certain condensation reactions involving the chlorine atoms of the chlorinated hydrocarbons. As a result, the solvent may decompose, sometimes vigorously, with the evolution of products such as hydrochloric acid or phosgene and the formation of a gummy mass. Thus metallic apparatus, in which the solvent is used, is subject to severe corrosion and dangerous fumes are given off. It is therefore of great industrial importance to prevent or retard decomposition of volatile chlorinated hydrocarbon solvents. Since cleaning treatments of metals or other objects are in practice carried out in the vapor as well as the liquid phase, it is necessary to prevent decomposition of volatile hydrocarbon solvents in both the vapor and liquid phases.

An object of this invention is to provide a method for preventing or substantially retarding the decomposition of volatile chlorinated hydrocarbon solvents under the influence of air, heat, light and metals, such as iron or aluminum. A further object of this invention is to provide a cleaning composition comprising a stabilized volatile chloro hydrocarbon solvent in which the stabilizer is sufficiently volatile to be present in effective amounts in the vapor of the chlorohydrocarbon. Another object is to provide a stabilizer for volatile chlorohydrocarbons which is effective in low concentrations in both the liquid and vapor phase. A still further object is to provide a stabilized chlorinated hydrocarbon solvent for the degreasing of metals. An additional object is to provide a practical and safe method of degreasing metals with a volatile chlorohydrocarbon solvent. Other objects will appear hereinafter.

These objects are accomplished by adding to the volatile chlorinated hydrocarbon an effective amount of a heterocyclic compound having a boiling point below 175° C. and containing as ring atoms, carbon, nitrogen and a chalcogen of atomic weight below 33. Such a chalcogen is oxygen or sulfur. It has now been discovered that volatile chlorohydrocarbons containing a heterocyclic compound boiling below 175° C. and having as ring atoms, carbon, nitrogen and a chalcogen of atomic weight below 33 are stabilized against decomposition. Volatile chlorohydrocarbon solvents containing a volatile stabilizing agent of this invention can be used in the vapor and liquid phases for the degreasing of metals as the volatile chlorohydrocarbon solvents are stabilized against decomposition in both phases.

In order to produce effective results, the stabilizer should be used in an amount of at least 0.02% based on the weight of the chlorohydrocarbon. It is in general unnecessary and uneconomical to use more than a small amount, such as 1% of the stabilizer, a concentration of about 0.05 to 0.25% based on the chlorohydrocarbon being preferred in most instances.

In a preferred embodiment of this invention, the stabilizing agent is a five-membered heterocyclic compound boiling below 175° C., and containing as ring members, three carbon atoms, one nitrogen atom, and one oxygen or one sulfur atom. It is also preferable that any ring atom substituents be selected solely from the class consisting of hydrogen and low molecular weight alkyl groups containing less than four carbon atoms. In a particularly preferred embodiment of this invention, the decomposition inhibitor is a heterocyclic compound boiling below 150° C., and selected from the group consisting of oxazoles, oxazolines, oxazolidines, isoxazoles, isoxazolines, thiazoles and thiazolines.

In order to be effective in the vapor phase as well as in the liquid phase, the stabilizer must be volatile with the vapor of the chlorinated hydrocarbon solvent. In practice, this requires that the stabilizer should boil below about 175° C. at atmospheric pressure. The preferred stabilizers are those which boil below about 150° C. Because of this volatility requirement and of the desired chemical inertness, it is preferred that the heterocyclic compounds suitable for use in this invention have no substituents on the ring atoms except hydrogen or low molecular weight alkyl groups, that is alkyl groups containing less than four carbon atoms. The preferred stabilizer from the standpoint of all-around effectiveness is 2-methyl-2-oxazoline.

The chlorinated hydrocarbons to which this invention is chiefly applicable are the volatile chlorohydrocarbon solvents boiling below about 150° C., particularly the volatile aliphatic chlorohydrocarbon solvents, examples of which are chloroform, carbon tetrachloride, and the lower alkyl chlorides such as the butyl, amyl and hexyl chlorides, dichloroethane trichloroethylene, tetrachloroethylene, and tetrachloroethane. However, this invention is generally applicable to volatile chlorohydrocarbons and includes cyclic chlorohydrocarbons, such as chlorocyclohexane and chlorobenzene.

One of the most important of the volatile chlorohydrocarbon solvents is trichloroethylene, and the invention will be further illustrated with reference to this particular solvent. In the following examples, parts are by weight, unless otherwise stated.

*Example I*

A series of tests were made on trichloroethylene containing various stabilizing agents of this invention and compared with a test made under the same conditions on trichloroethylene which did not contain a stabilizing agent of this invention. In these tests, two hundred and ninety-four (294) parts by weight of trichloroethylene, to which was added 0.1 part of powdered iron and 0.29 part of stabilizing agent, was boiled under total reflux for four hours while exposed to the ultraviolet light supplied by a General Electric S–4 Sunlamp at a distance of 25 cm. from the center of the liquid. Oxygen was introduced under the boiling solvent at a constant rate. The condensate dropped through 50 parts of water in a separate chamber before being returned to the boiler. At the end of the test period the total acid developed was determined by titrating aliquots of the chlorohydrocarbon and water with 0.01 N sodium hydroxide solution. The values given in the following table are the number of cc. of 0.01 N solution required to neutralize the total acid developed from 100 cc. of trichloroethylene.

| Stabilizer | Boiling Point of Stabilizer, °C. | Weight Per Cent Stabilizer | cc. 0.01 N NaOH to neutralize acid from 100 cc. trichloroethylene |
|---|---|---|---|
| None | | 0 | 650 |
| 2-Methyl-2-Oxazoline | 110 | 0.1 | 80 |
| 2-Methyl-2-Thiazoline | 145 | 0.1 | 38 |
| 2,4-Dimethyloxazole | 108 | 0.1 | 245 |
| Thiazole | 117 | 0.1 | 80 |
| 2-Thiazoline | 138 | 0.1 | 60 |

*Example II*

In another series of accelerated tests, the stabilized chlorohydrocarbon was maintained at a high temperature in the absence of oxygen but in the presence of powdered aluminum metal. In this test, 75 parts of trichloroethylene containing 0.1% by weight of stabilizer and 0.2 part of 100 mesh aluminum powder was held at 150° C. for 24 hours in a sealed vessel from which substantially all oxygen had been removed. At the end of the test the vessel and contents were washed with 100 parts of 5% nitric acid and the chloride content of the wash liquor determined by adding excess 0.02 N silver nitrate solution and back titrating with 0.02 N potassium thiocyanate solution using ferric alum indicator. The amount of chlorine formed per 100 cc. of chlorohydrocarbon was taken as a measure of the extent of decomposition.

| Stabilizer | Weight per cent stabilizer | mg. Cl ion per 100 cc. trichloroethylene |
|---|---|---|
| None | 0 | 576 |
| 2-Methyl-2-Oxazoline | 0.1 | 6.5 |
| 2-Methyl-2-Thiazoline | 0.1 | 96 |
| 2,4-Dimethyloxazole | 0.1 | 22 |
| Thiazole | 0.1 | 21 |
| 2-Thiazoline | 0.1 | 87 |

*Example III*

Five hundred and forty parts of trichloroethylene, 5 parts of 100 mesh aluminum, and 0.5 part of powdered iron were boiled under total reflux. Samples were withdrawn periodically and acidity determined by titration with 0.01 N sodium hydroxide. After 24 hours, 68 cc. of 0.01 N sodium hydroxide were required to neutralize a 25 cc. sample from a test made with unstabilized trichloroethylene. In a similar test with trichloroethylene containing 0.08% by weight of 2-methyl-2-oxazoline, a 25 cc. sample taken after refluxing for 480 hours required only 8.0 cc. of 0.01 N NaOH.

While the invention has been illustrated with reference to certain specific inhibitors, other heterocyclic compounds containing, as ring atoms, carbon, nitrogen and a chalcogen of atomic weight below 33 (oxygen or sulfur) may be used successfully, including the following:

|  | B. P. °C. |
|---|---|
| Isoxazole | 95 |
| 3-methylisoxazole | 118 |
| 5-methylisoxazole | 122 |
| 3,5-dimethylisoxazole | 141 |
| 2,5-dimethyl-2-oxazoline | 118 |
| 3,3,5-trimethyl-4-isoxazoline | 163 |
| 3-methyloxazolidine | 100 |
| 2,3-dimethyloxazolidine | 109 |
| 2-methylthiazole | 128 |
| 4-methylthiazole | 133 |
| 2,5-dimethyl-2-thiazoline | 152 |
| 2-ethyl-2-thiazoline | 162 |
| 5-methyl-2-ethyl-2-thiazoline | 172 |

More than one stabilizer may be used, and other beneficial adjuvants such as known antioxidants may be added if desired.

The stabilized chlorohydrocarbons made available by this invention find their chief use in the cleaning and degreasing of metals or alloys such as iron, steel, aluminum, nickel, chromium, copper, brass, and the like or of articles made therefrom. However, they are also useful whenever a chlorinated solvent is to be exposed to air, light and elevated temperatures for prolonged periods of time, as in the textile cleaning industry or in solvent extraction processes. The volatile stabilizers of this invention have the further advantage that they can be recovered with the solvent when the latter is distilled from the oil, grease and dirt left in it after a cleaning operation, thus avoiding unnecessary waste and economic loss.

As many apparently widely different embodiments of this invention may be made without departing from the spirit and scope thereof, it is to be understood that I do not limit myself to the specific embodiments thereof except as defined in the appended claims.

I claim:
1. A method for retarding the decomposition of a volatile aliphatic chlorohydrocarbon solvent boiling below about 150° C. which comprises adding thereto .02% to 1%, based on the weight of said chlorohydrocarbon solvent, of 2-methyl-2-oxazoline.

2. A cleaning composition stabilized against decomposition consisting essentially of a volatile aliphatic chlorohydrocarbon solvent boiling below about 150° C. and from .02% to 1%, based on the weight of said chlorohydrocarbon solvent, of 2-methyl-2-oxazoline.

3. A cleaning composition stabilized against decomposition consisting essentially of a volatile aliphatic chlorohydrocarbon solvent boiling below about 150° C. and from .02% to 1%, based on the weight of said volatile aliphatic chlorohydrocarbon solvent, of a five-membered heterocyclic compound boiling below 175° C., having as ring atoms, three carbon atoms, one nitrogen atom and one atom selected from the class consisting of oxygen and sulfur atoms and wherein any ring atom substituents other than hydrogen are alkyl groups containing less than four carbon atoms.

4. A cleaning composition as set forth in claim 3 in which said volatile aliphatic chlorohydrocarbon solvent is trichloroethylene.

5. A cleaning composition consisting essentially of a volatile aliphatic chlorohydrocarbon solvent boiling below about 150° C. and from .02% to 1%, based on the weight of said volatile aliphatic chlorohydrocarbon solvent, of a five-membered heterocyclic compound boiling below 175° C., having as ring atoms, three carbon atoms, one nitrogen atom and one oxygen atom and wherein any ring atom substituents other than hydrogen are methyl groups.

6. A cleaning composition consisting essentially of a volatile aliphatic chlorohydrocarbon solvent boiling below about 150° C. and from .02% to 1%, based on the weight of said volatile aliphatic chlorohydrocarbon solvent, of a five-membered heterocyclic compound boiling below 175° C., having as ring atoms, three carbon atoms, one nitrogen atom and one sulfur atom and wherein any ring atom substituents other than hydrogen are methyl groups.

7. A method for retarding the decomposition of a volatile aliphatic chlorohydrocarbon solvent boiling below about 150° C. which comprises adding thereto from .02% to 1%, based on the weight of said volatile aliphatic chlorohydrocarbon solvent, of a five-membered heterocyclic compound boiling below about 175° C., having as ring atoms, three carbon atoms, one nitrogen atom and one atom selected from the class consisting of oxygen and sulfur atoms and wherein any ring atom substituents other than hydrogen are alkyl groups containing less than four carbon atoms.

8. A method as set forth in claim 7 in which said volatile aliphatic chlorohydrocarbon solvent is trichloroethylene.

9. A method for retarding the decomposition of a volatile aliphatic chlorohydrocarbon solvent boiling below about 150° C. which comprises adding thereto from .02% to 1%, based on the weight of said volatile aliphatic chlorohydrocarbon solvent, of a five-membered heterocyclic compound boiling below 175° C., having as ring atoms, three carbon atoms, one nitrogen atom and one oxygen atom and wherein any ring atom substituents other than hydrogen are methyl groups.

10. A method for retarding the decomposition of a volatile aliphatic chlorohydrocarbon solvent boiling below about 150° C. which comprises adding thereto from .02% to 1%, based on the weight of said volatile aliphatic chlorohydrocarbon solvent, of a five-membered heterocyclic compound boiling below 175° C., having as ring atoms, three carbon atoms, one nitrogen atom and one sulfur atom and wherein any ring atom substituents other than hydrogen are methyl groups.

11. A method for retarding the decomposition of trichloroethylene which comprises adding thereto from .02% to 1% of 2-methyl-2-oxazoline, based on the weight of said trichloroethylene.

12. A cleaning composition stabilized against decomposition consisting essentially of trichloroethylene and from .02% to 1% of 2-methyl-2-oxazoline, based on the weight of said trichloroethylene.

ARTHUR W. LARCHAR.

REFERENCES CITED

The following references are of record in the file of this patent:

UNITED STATES PATENTS

| Number | Name | Date |
|---|---|---|
| 2,111,990 | Reid et al. | Mar. 22, 1938 |
| 2,316,011 | Miller et al. | Apr. 6, 1943 |
| 2,371,645 | Aitchison et al. | Mar. 20, 1945 |